US006246994B1

(12) United States Patent
Wolven et al.

(10) Patent No.: US 6,246,994 B1
(45) Date of Patent: Jun. 12, 2001

(54) SYSTEM AND METHOD FOR PROVIDING STANDARDIZED INDIVIDUAL INFORMATION

(75) Inventors: H. Makaala Wolven, Waldoboro, ME (US); Quintin Gregor, Houston, TX (US)

(73) Assignee: TheRightSize, Inc., Burlingame, CA (US)

( * ) Notice: Subject to any disclaimer, the term of this patent is extended or adjusted under 35 U.S.C. 154(b) by 0 days.

(21) Appl. No.: 09/253,817

(22) Filed: Feb. 19, 1999

(51) Int. Cl.$^7$ .................................................. G06F 17/60

(52) U.S. Cl. .................................. 705/14; 702/1; 702/2; 702/3; 709/203; 709/217

(58) Field of Search .................................. 705/3, 26, 2, 1, 705/14; 702/1; 709/203, 217; 707/10, 104; 700/132

(56) References Cited

U.S. PATENT DOCUMENTS

| 4,149,246 | 4/1979 | Goldman . |
| 5,195,030 | 3/1993 | White . |
| 5,216,594 | 6/1993 | White et al. . |
| 5,339,252 | 8/1994 | White et al. . |
| 5,515,268 | 5/1996 | Yoda . |
| 5,539,677 | 7/1996 | Smith . |
| 5,867,821 | * 2/1999 | Ballantyne et al. ..................... 705/2 |

FOREIGN PATENT DOCUMENTS

09238422 * 9/1997 (JP) .

OTHER PUBLICATIONS

Guenther Kim, Inside the Internet, PP 1–5, Nov. 1996.*
Anthony I. Velocci, Jr., Competitors Square off over TI Acquisition, Aviation week & Space Technology, PP 1–4, Mar. 1997.*
Jim Balderston, Security Vendors, Infoworld, PP 1–3, Apr. 1997.*
Brown Jim, New Package Gives Micros Data Base Server Features, Network World PP 1, Jan. 1989.*
Pasahow Ed, Will Network Computers measue up?, PP 1–2, Nov. 1996.*

* cited by examiner

Primary Examiner—James P. Trammell
Assistant Examiner—Mussie Tesfamariam
(74) Attorney, Agent, or Firm—Fenwick & West LLP

(57) ABSTRACT

A system and a process to facilitate transactions between individuals and providers of goods and/or services. The system includes a master database unit for retaining information related to various characteristics of interest of a plurality of individuals. Each set of information associated with a particular individual is provided with a unique personal code that is supplied to the individual. In any remote communications with the goods/services provider, the individual supplies the personal code. The provider in turn contacts the master database unit and supplies an access code and a particular one or more of the personal codes. The master database unit returns to the provider the set or sets of information associated with the personal code or codes. Based on that information the provider can ensure compatibility of the goods or services with the individual's interests and characteristics. The system of the invention reduces the interface time between the individual and the provider. It also ensures the relevant information can be supplied more quickly and with greater accuracy.

54 Claims, 6 Drawing Sheets

SYSTEM AND METHOD FOR PROVIDING STANDARDIZED INDIVIDUAL INFORMATION

BACKGROUND OF THE INVENTION

1. Field of the Invention

The present invention relates to systems for organizing information related to the characteristics of individuals. More particularly, the present invention relates to systems and methods for gathering such information for centralized storage and access from remote locations. The present invention is a system that enables remote subscribers to access individual's information in order to provide compatible goods and services.

2. Description of the Prior Art

Database systems have been developed for many years as relatively convenient means to store information of interest in a centralized and accessible location. That location may be one or more filing cabinets, for example, when the storage means is paper. With the introduction and development of computing systems, and personal computing systems in particular, the storage location can easily be a computer and the storage means is any sort of compatible storage device. These devices include, but are not limited to, data storage media such as computer hard drive, random-access and read-only memories, floppy disks, and CD-ROM to name only the well-known computer-based storage media. Their usefulness in retaining vast amounts of information in a relatively small physical presence is apparent. The ever increasing speed and capacity associated with the continuing evolution of computing systems makes access to this vast quantity of information easier and more desirable.

The types of information that can be stored in a database are almost limitless. For purposes of the present invention to be described herein, information associated with the characteristics of individuals is one such type. That is, information regarding the educational background, employment background, medical history, for example, of one or more persons can be, and is, retained in a computer-based database. In addition, the physical characteristics, such as physical dimensions, of individuals can be gathered and stored in a database. Among other things, this type of information would be of particular value to suppliers of clothing, footwear, and the like.

Increasingly, more individuals are purchasing clothing (including footwear, headwear, and other peripherals) remotely rather than in point-of-sale transactions. Such sales are made via in-home purchases through telephone or written requests based on observed catalog information, or via computer-based interfacing, such as through the Internet. One aspect of clothing purchasing lost in these remote transactions is the fit of the purchased item. In point-of-sale transactions of the type that occur at the retailer located at the nearby mall, the consumer can touch items of interest, get a strong sense of their appearance and, importantly, they can try them on to confirm fit prior to completing the purchase. On the other hand, remote sales do not permit such direct contact and confirmation of the compatibility of the product with the individual's unique characteristics. They do, however, provide considerable convenience to the consumer who can usually make purchases at any time, and in much less time, than expended in a point-of-sale transaction. The corresponding reduction in the expense associated with facilities upkeep and staffing make remote sales desirable for goods and services suppliers.

Although statistics vary from one supplier to the next, it is well known that returns of remotely purchased clothing items constitute a significant portion of the transactions that occur. In some instances, it has been noted that perhaps as much as 50% of the retail catalog and Internet clothing sales are returned. One of the more common reasons for such returns is an incompatible fit of the clothing with the individual's physical characteristics. It is particularly difficult for the consumer in that regard because one supplier's size large may be the dimensional equivalent of another's small. Some suppliers attempt to alleviate this problem by offering charts relating a few physical dimensions (shoe size, waist size, inseam, for example) to that supplier's clothing sizes. Unfortunately, such relational charts are generally insufficient to ensure an accurate fit. The result is aggravation for the consumer who may be less inclined to continue making remote purchases and increased costs for the supplier as a result of the need to process, and absorb the expense of, the return.

Some attempts have been made to provide means enabling consumers to purchase from a remote site clothing that will likely be of a suitable size. U.S. Pat. No. 5,515,268 issued to Yoda describes a system that permits a consumer to access a remotely located computer containing information regarding available products, clothing in particular. The Yoda system comprises a processor including a shape sensor that scans the individual consumer. The consumer's scanned image is processed and compared with clothing of the type desired by the consumer. The computer provides to the consumer an output indicating what size clothing will fit and whether the selected clothing is available to order. Assuming the clothing of interest is available in a suitable size, the consumer can then place an order. Unfortunately, the Yoda system requires the consumer to proceed to a location where the scanning unit exists. Moreover, each supplier would have to make available its own scanning and processing system in order to enable the system. This would be a costly and expensive undertaking, and would require continual maintenance to ensure appropriate scanner calibration.

In another clothing ordering system previously disclosed, U.S. Pat. No. 4,149,246 issued to Goldman describes a system for remote interfacing between a consumer and a supplier. The Goldman system allows a consumer to input into a computing system physical dimension data and transfer that data to the supplier. The supplier in turn creates a custom-fabricated piece of clothing based on that data. This system is preferable over the Yoda system in that the consumer can effect an order from a remote location of choice. However, Goldman is not suitable for the relatively large volume supplier in that it requires custom fabrication. In some instances that may be suitable, but it is terribly cost inefficient and renders the process impractical and uneconomical for most consumers as well as most suppliers, particularly those offering products by catalog.

Therefore, what is needed is a system and a method to enable consumers to obtain products and services, including clothing, remotely from a place of choice, such as the home. What is also needed is a system and a method that enables remotely positioned suppliers to provide products and services that accurately conform to the characteristics of the purchaser. Further, what is needed is such a system that is relatively easy to establish and maintain using existing computing devices and programming techniques. Yet further, what is needed is such a system that requires minimal peripheral equipment to satisfy the consumer's needs and the supplier's capabilities. Such a system may further be developed more generally to provide synchronized readily accessible data regarding most any sort of individualized information.

SUMMARY OF THE INVENTION

It is an object of the present invention to provide a system and a method to enable consumers to obtain products and services, including clothing, remotely from a location of choice. It is also an object of the present invention to provide a system and a method that enables remotely positioned suppliers to provide products and services that accurately conform to the characteristics of the purchaser. A further object of the present invention is to provide such a system that is relatively easy to establish and maintain using existing computing devices and programming techniques, and that requires minimal peripheral equipment to satisfy the consumer's needs and the supplier's capabilities. The present invention is further provided as a system to provide synchronized readily accessible data regarding most any sort of individualized information.

These and other objectives are achieved in the present invention through the formation of a database of information related to the characteristics, e.g., physical, medical, and any others of interest, of a plurality of individuals. The database is developed either by gathering information of interest directly from such individuals or by accessing existing databases of such information. A key aspect of the invention is the creation for each individual of a personal code that enables access within the database to the subset of information associated with that individual. Using appropriate security measures, database subscribers, such as retail clothing providers for example, are permitted to gain access to the individual's information when contacted by the individual (or another with permitted access to the personal code, such as a gift giver) to provide goods or services. The system further includes for each subscriber means, such as a computer program, to compare the individual's accessed information with the characteristics, including availability, of the products and/or services provided by the subscriber.

The system of the present invention is an effective three-way interface between the individual, the provider of goods and/or services, and the database manager. The individual can, from a location of choice, contact the provider directly regarding that which the provider offers. The individual gives the provider the personal code and information regarding goods or services of interest, which information has been developed by the provider. At or about the same time, the provider independently contacts the database manager and presents the necessary provider security access code as well as the individual's personal code. The database manager returns to the provider requisite information relevant to the completion of the transaction initiated by the individual. The provider compares that individualized information with its own information regarding availability of products and/or services compatible with that individual's characteristics and stated products/services interests. This three-way interaction may all occur while the individual and provider remain in communication, such as through a telephone link.

The advantages provided by the system and method of the present invention are apparent. First, the individual can, from a location of choice, interface with the goods/services provider in a manner substantially the same as has become prevalent. There is no requirement to proceed to a point-of-sale retail site. In regard to clothing purchases for example, and those prior-art sizing and custom fabricating systems previously described in particular, there is no requirement to travel to a specific location for body scanning. However, it is to be noted that the present invention does provide significant advantages over the prior art in point-of-sale transactions as well. Specifically, a customer may enter a goods/services provider with a conventional swipe card, or the like, and use that device to initiate the process of retrieving the stored personal information of interest in regard to that particular provider.

For the goods/services provider there are significant advantages associated with the system of the present invention. The time associated with the interaction between the company employee and the customer may be reduced significantly as all relevant information can be obtained immediately upon receipt of the personal code. More importantly, correct use by the provider of the information obtained will ensure that a particular product or service, if available, will conform to the customer's characteristics. Returns would thereby be significantly reduced. In the long term, goods and services providers will be able to focus their inventory to those items in those sizes (again in the example of clothing) most commonly sought. Finally, gift givers would be able to purchase suitable products and/or services for particular individuals with certainty of choice as well as sizing, without the individual being aware of the transaction. This is of particular value, for example, to spouses purchasing gifts for a variety of special occasions.

Of course, it can be seen that the basic advantages of the present invention may be extended well beyond the area of remote clothing sales. For example, an individual's medical characteristics may be stored in the master database and accessed through the personal code. The local and mail order pharmacists, the physician, the emergency medical technician, and the hospital would immediately be able to identify all relevant medical information associated with that individual. The impact on the speed and certainty of the care provided would be significant. There would be an important reduction in errant prescriptions. Medical service providers would have immediate medical history and thereby be able to develop a suitable course of treatment in a fraction of the time now involved in either waiting to discover that information or conducting trial-and-error treatment steps.

The system of the present invention provides for each individual complete physical size information including, but not limited to, physical vagaries (such as a physical deformity, lost limbs, etc.), materials and colors of interest, allergies to materials, mailing, shipping, billing, and communications addresses—all information of interest to a clothing supplier. For the medical services provider, the system of the present invention includes, but is not limited to, for each individual similar types of information that may be applicable to care for the individual in life and in death (such as the necessary size of a coffin, personal preferences as to body disposal, to name two), full medical characteristics and donor status, and home and emergency contacts and the like. The database is further designed to accommodate information that may be available in the future such as, for example, DNA mapping of an individual should that technology be developed.

In the area of transportation, hotel/motel, entertainment providers, and the like, such a provider can access the system of the present invention in order to obtaining physical sizing for seating requirements, preferences as to style, level, class of travel or accommodation, food allergies, dietary requirements, and personal and emergency contact information. In summary, the combination of the master database and personal code of the present invention provide many advantages in the accuracy of essentially any goods/services transactions.

It is to be understood that other objects and advantages of the present invention will be made apparent by the following description of the drawings according to the present invention.

DETAILED DESCRIPTION OF THE PREFERRED EMBODIMENT

Figure 1:
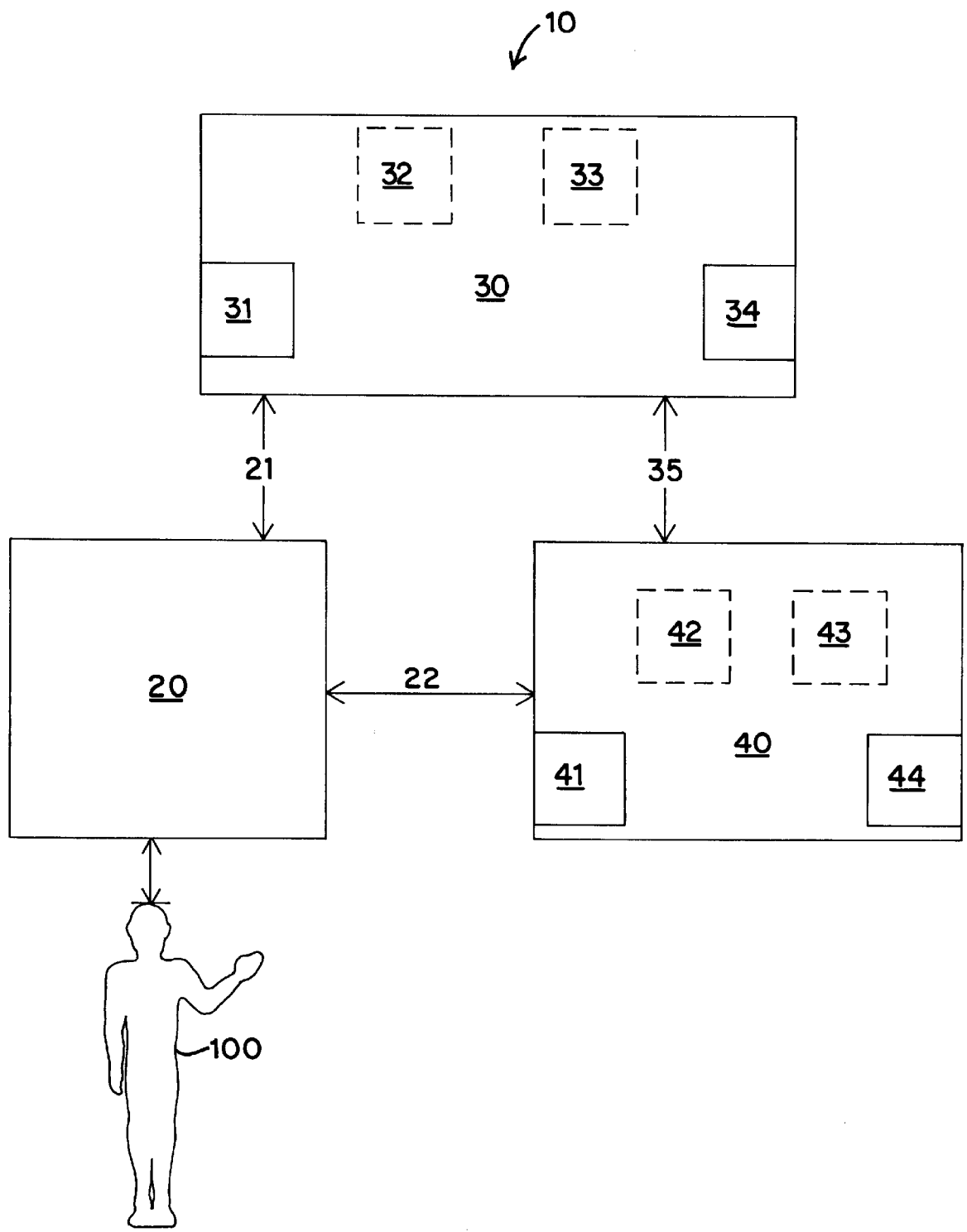
FIG. 1 is a simplified schematic diagram of the system interface of the present invention.

An information accessing and transaction assisting system 10 of the present invention is shown in simplified form in FIG. 1. The system 10 includes an individual interface unit 20, a master database unit 30, and a goods/services provider unit 40. Each of units 20, 30, and 40, is coupled together in a manner such that information may be shared between all three associated entities of an individual 100, a database manager, and a goods/services provider. The interfacing between those entities provided by the system 10 is designed to enable the provider to supply to the individual 100 goods and/or services compatible with the individual's relevant characteristics.

The interface unit 20 may take to form of any type of device capable of delivering information between the individual 100 and either the database manager or the provider. Obvious forms of the interface unit include, but are not limited to, computer means such as personal computers, network-linked computing units, personal digital assistants and the like, satellite and/or cable based audio telephones, televisions, facsimile machines, magnetic devices such as swipe cards, as well as express and standard mail. Through the unit 20, the individual 100 first provides to the database unit 30 information regarding various specific characteristics of the individual 100. This information may include clothing and footwear dimensions, tastes in clothing or any sort of individual goods/services preferences. The information may also include characteristics of the individual 100 that are not directly tied to items that the individual may wish to obtain, but are nevertheless unique to the individual 100, such as medical history of allergies, past surgical procedures, to name just two.

The information is transferred from the individual unit 20 to the database unit 30 via an information link 21 of any suitable type including, but not limited to, wireless, hard-wired, magnetic transceivers, optical readers, or conventional forms of mail. Initially, the database manager through an information transceiver 31 of the unit 30 may obtain the information from the individual 100 directly or indirectly. The transceiver 31 may be a standard RS-232 communications port, a radio message transceiver, or simply an employee who takes audio or textual information obtained from the individual 100 and inputs it into the unit 30. The database unit 30 further includes a storage component identified in the simplified illustration as item 32 within which the information obtained from the individual 100 is retained. The storage component 32 may be any suitable form of mass storage device including, but not limited to, a mass storage area of a computing unit, such as a mainframe or personal computer, CD-ROM, or a floppy disk. The storage unit 32 is coupled to a processor 33 that controls the flow of the information into and out of the unit 30. The storage unit 32 is preferably designed to retain a considerable volume of data as the number of individuals providing information increases.

Upon confirmation that the information provided is suitably complete, based on parameters developed by the database manager, the processor 33 provides through interface 31 to the individual 100 a personal code that is unique to that individual. The personal code may take any suitably transferable form, such as a digitally based series of alphanumeric inputs. Of course, the personal code may take some other form, such as a fingerprint, an eye print, a voice print or any other unique identifier system that has been or that may be developed. The personal code obtained from the database manager can then be used by the individual 100 to communicate requisite information to the provider. Specifically, the individual 100 may communicate with the provider at provider unit 40 through the individual unit 20. A provider link 22 that may be the same as the information link 21 or similar thereto, enables communication between the individual 100 and the provider. The provider link 22 may be a wireless coupling, a hard-wired coupling, a magnetic device for receiving magnetic swipe cards, any conventional form of mail, or even an in-person contact, linked to a provider transceiver 41 that may be substantially the same as transceiver 31.

The final interface of the system 10 of the present invention involves the link between the database unit 30 and the provider unit 40. A provider interface transceiver 34 of the database unit 30 is coupled to a database transceiver 42 of the provider unit 40 via database link 35. Transceiver 34 and transceiver 42 may each be any suitable type of transceiver such as that described with reference to transceiver 31. Further, the database link 35 may be any form of high-speed interface, such as a wireless coupling, a hard-wired coupling, a magnetic device for receiving magnetic swipe cards. In some circumstances it may be a slower communications device, such as any conventional form of mail, or even an in-person contact. It is through database link 35 that the provider unit 40 transmits a unique access code of suitable configuration, such as a digitally based alphanumeric sequence for example, to the database unit 30 through transceiver 34. The access code is accompanied by the individual's personal code supplied by the individual 100 to the provider. The database link 35 also enables exchange from the database unit 30 to the provider unit 40 of the relevant 30 information of the individual 100 sought by the provider. The provider unit 40 preferably includes a processor 43 and a local storage device 44 for retaining and processing the relevant information such that the individual 100 may be supplied with price, availability, and other relevant information regarding compatible goods and/or services sought.

After the individual 100 has supplied relevant characteristic information to the master database unit 30 and has received a personal code, the process associated with the interfaces described with respect to FIG. 1 includes the following steps. First, the individual 100 contacts the provider via unit 20 and unit 40 in order to place an order for goods or services, or for other forms of assistance. Preferably, the provider's first step is to obtain the individual's personal code. That personal code and the provider's access code are then relayed from the provider unit 40 to the database unit 30 while the individual 100 continues to describe the particular goods and/or services sought from the provider. During the development of that transaction, the processor 33 of the database unit 30 confirms the access and personal codes, retrieves the characteristic information of the individual 100 from the storage unit 32 and relays it back to the provider unit 40. The provider processor 43 compares the individual's characteristics with the goods/services sought by the individual 100 and available to the provider through inventory software or other means. The transceiver 41 then supplies to the individual 100 through unit 20 information regarding pricing, availability, and the like necessary for completion of the transaction. The individual 100 may then make a final decision whether to complete the transaction with much greater certainty as to compatibility than has been available in past remote transactions. The provider can optionally store information associated with the transaction in local storage unit 44.

Figure 2:
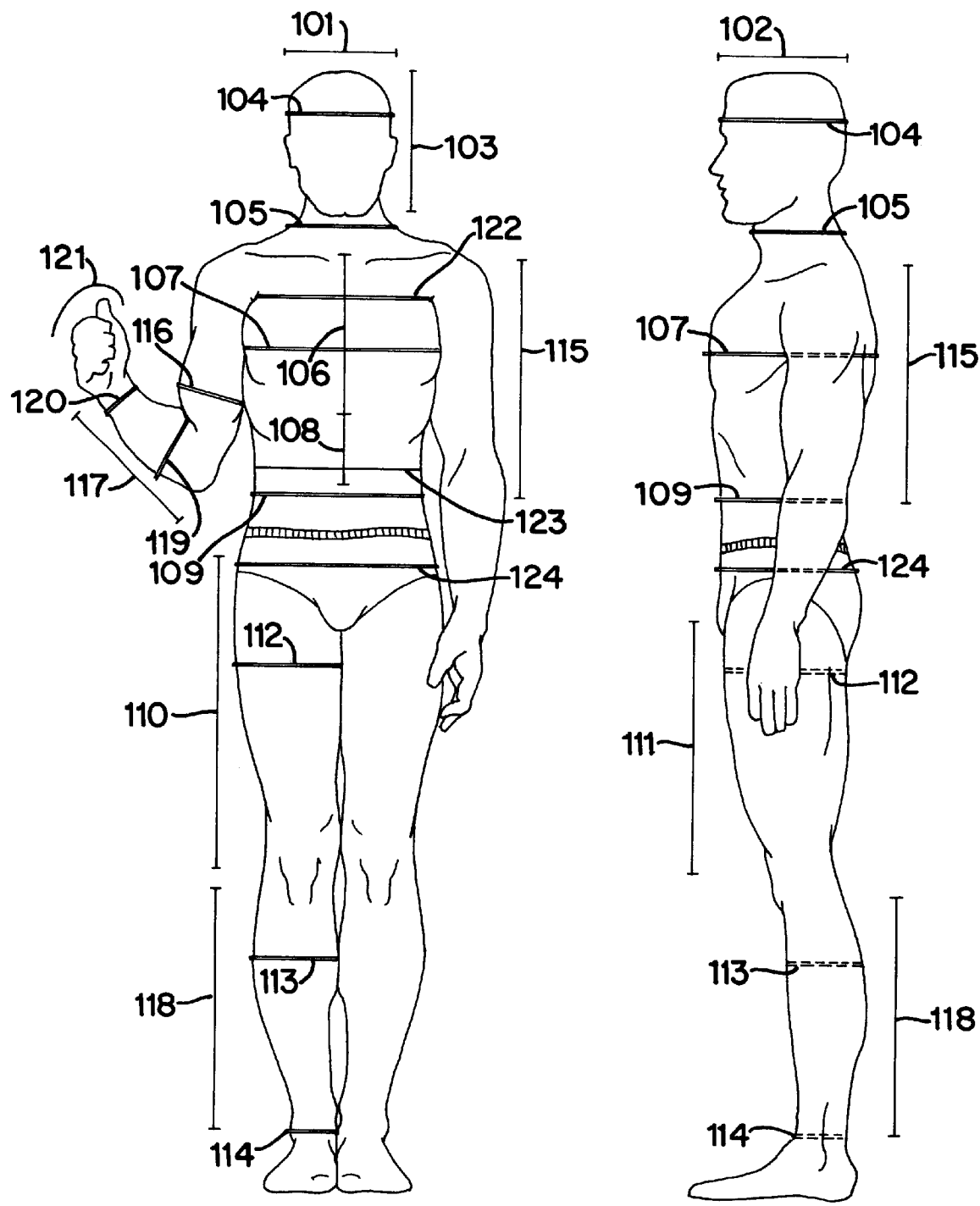
FIG. 2 is a simplified front view of an individual showing measurement sites for providing individualized information with regard to clothing sizes for example.

An example form of individual information suitable for delivery by the individual 100 to the master database unit 30 is shown in FIG. 2 with respect to a remote clothing purchase based on material presented in a mail-order catalog. Generally, consumers provide, at most, the following information regarding clothing sizes: 1) an indication of whether a small, medium, large, etc. is desired; 2) waist and inseam values for pants; 3) specific dress sizes presumed to be consistent from one provider to another; and 4) shoe size. Under even the most ideal present conditions, a consumer may supply the following information to the provider: neck, arm length, chest, waist, hip, and inseam dimensions, and shoe size. Gathering this information alone can be time consuming for the consumer as well as the provider. That form of relatively detailed communication, particularly when conducted verbally, can also lead to inaccuracies in the exchange. Therefore, in order to maximize the assurance of a compatible fit between the dimensions of the individual 100 and the clothing offered by the provider, the database unit 20 may be supplied with detailed dimensional information. As shown in FIG. 2, for example, the following 24 minimum measurement sites are suggested in order to improve fit certainty. A first location is the width of the head from ear-to-ear at 101. The second location is the width of the head from the nose to the back of the head at 102. The third location is the height of the head at 103. The fourth site is the circumference of the head at forehead level at 104. The fifth location is the neck circumference at 105. The sixth suggested measurement site is the distance from the collarbone to the solar plexus at 106. The seventh location is the chest circumference at 107. The eighth site is the distance from the solar plexus to the bend of the waist at 108. The ninth location is the waist circumference at 109. The tenth site is at the distance from the hip joint to the pivot of the knee at 110. The eleventh measurement location is the distance from the groin to the pivot of the knee at 111. The twelfth location is the circumference of the thigh at 112. The thirteenth site is the circumference of the calf at its widest point at 113. The fourteenth site is the circumference of the ankle at 114. The fifteenth location is the distance from the point of the shoulder to the pivot at the elbow shown at 115. The sixteenth location is the circumference of the flexed biceps at 116. The seventeenth location is the distance from the pivot of the elbow to the pivot of the wrist at 117. The eighteenth site is the length of the calf at 118. The nineteenth site is the circumference of the forearm at 119. The twentieth location is the circumference of the wrist at 120. The twenty-first location is a tracing of the hands at 121. The twenty-second site is the width of the chest at 122. The twenty-third site is the width of the waist at 123. The final preferred measurement location is the width of the hips at 124. Of course, these locations may be modified, or the number preferably increased, in order to enhance the effectiveness of the system 10.

Figure 3:
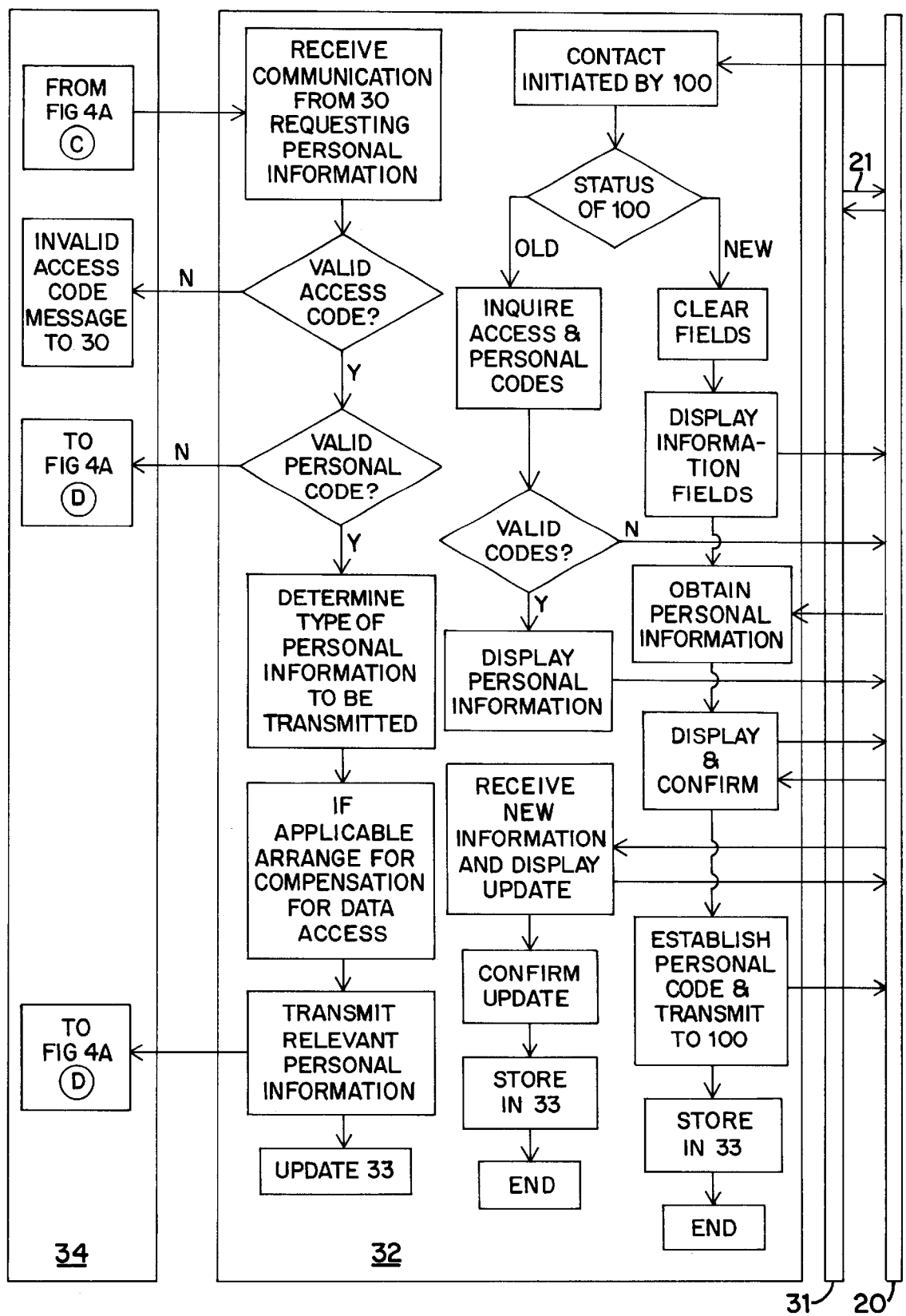
FIG. 3 is a flow chart of processing steps associated with the interface between the master database manager and a goods or services provider, and the interface between the master database manager and the individual providing information and receiving a personal code.
Figure 4:
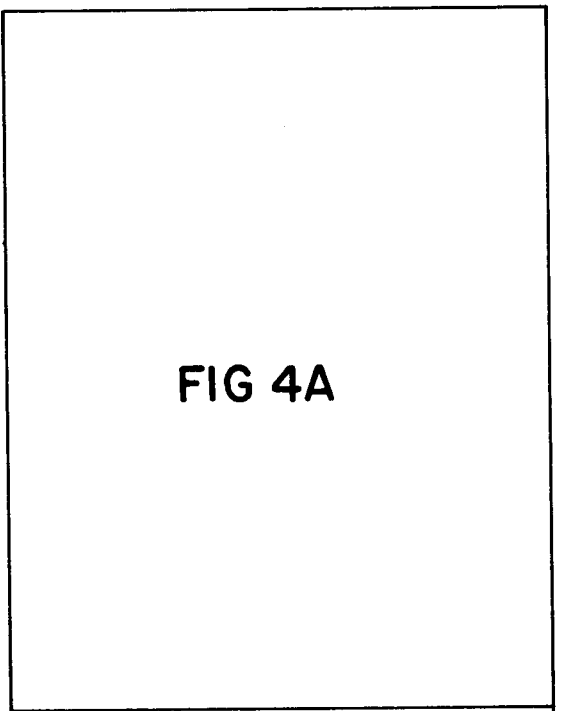
FIG. 4, including
Figure 4:
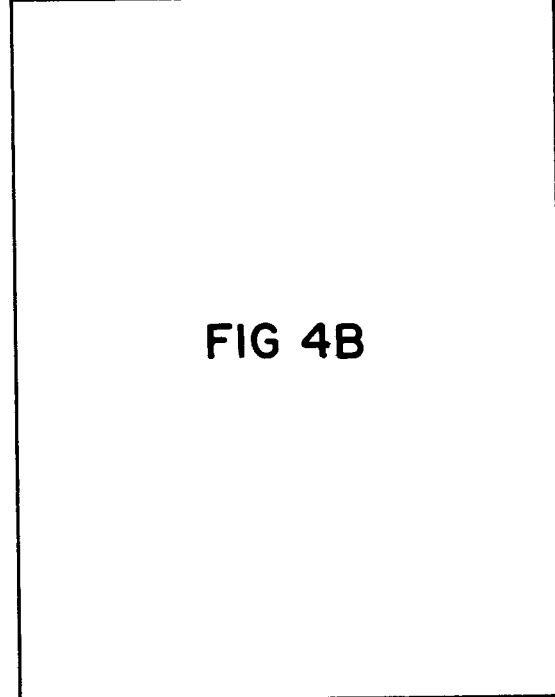

In order to enable the operation of the present invention, certain minimum process steps are required with reference to FIGS. 3 and 4. FIG. 3 provides a summary description of the preferred communications arrangement between the master database unit 30 and the individual unit 20 and the database unit 30 and the provider unit 40. Initially in establishing or revising the database, the database unit 30 receives from the individual 100 a contact designed to effect the creation of a personal code to be supplied to the provider unit 40 when a transaction is desired. The initial contact may be made directly by the individual 100 or through some suitable intermediary, such as a credit-card service for example. Either way, the status of the individual 100 is determined as being an existing database participant or a new one. If an existing participant, the individual 100 is prompted to supply an access code that may simply be the personal code. Once the code is validated, the processor 32 presents to the individual 100 his/her personal information. The individual 100 can then act to modify that information as desired, with the processor updating the storage device 33 and confirming with the individual 100 the accuracy of the information.

If the individual's status is that of a new participant, the processor 32 clears all relevant fields and presents them, preferably as a series of selectable choices, for the individual 100 to consider. The individual 100 enters personal data, such as sizing, medical information, addresses, etc., which are recorded with the storage device 33. The entered information is presented to the individual 100 for review and confirmation. Any changes are made and re-entered into the device 33. A personal code is then generated by the processor 32 and provided to the individual 100 for future use.

Figure 4A:
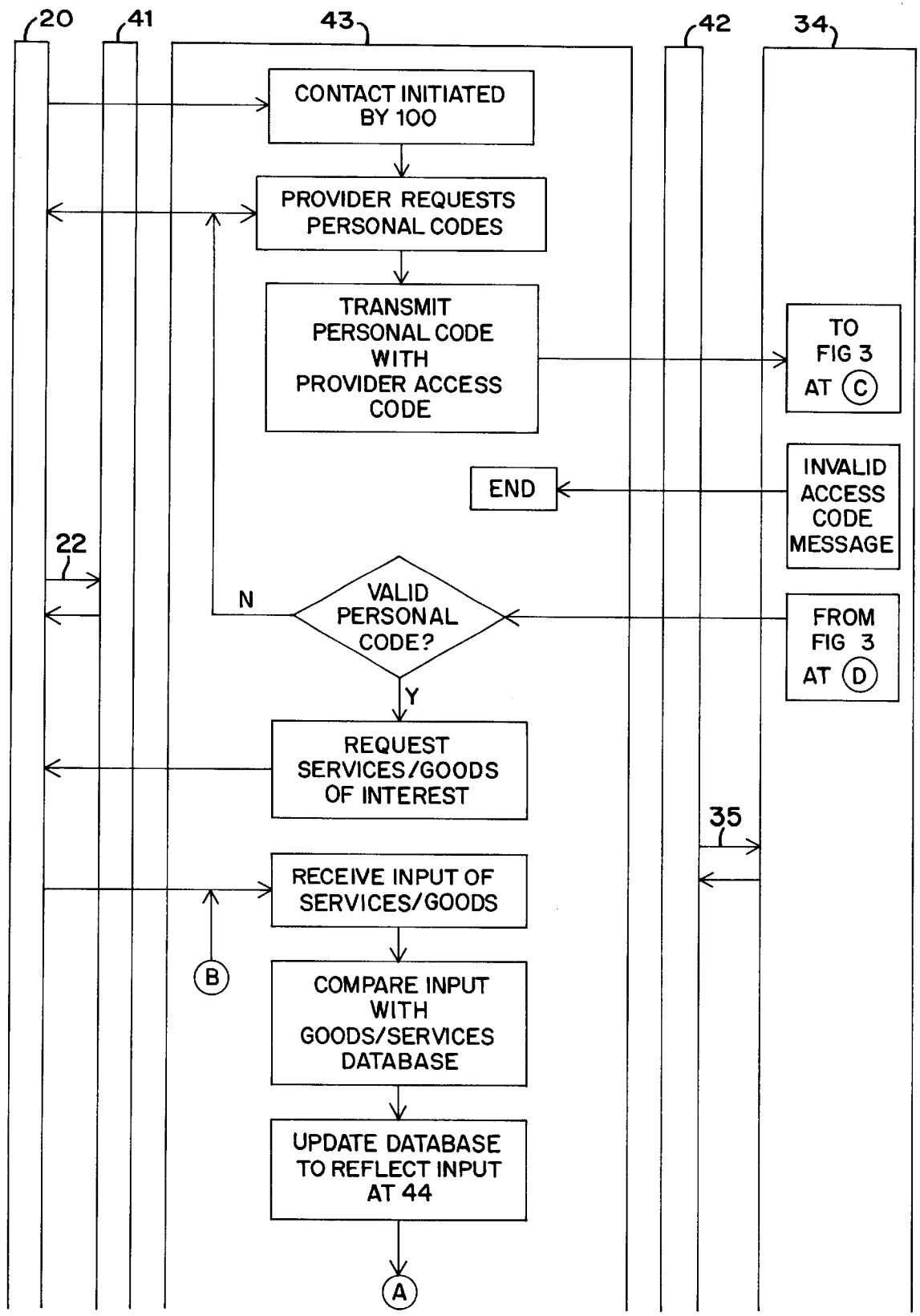
FIGS. 4A and 4B, is a flow chart of the processing steps associated with the interface between the goods or services provider and the master database manager, and the interface between the goods or services provider and the individual requesting goods or services.
Figure 4B:
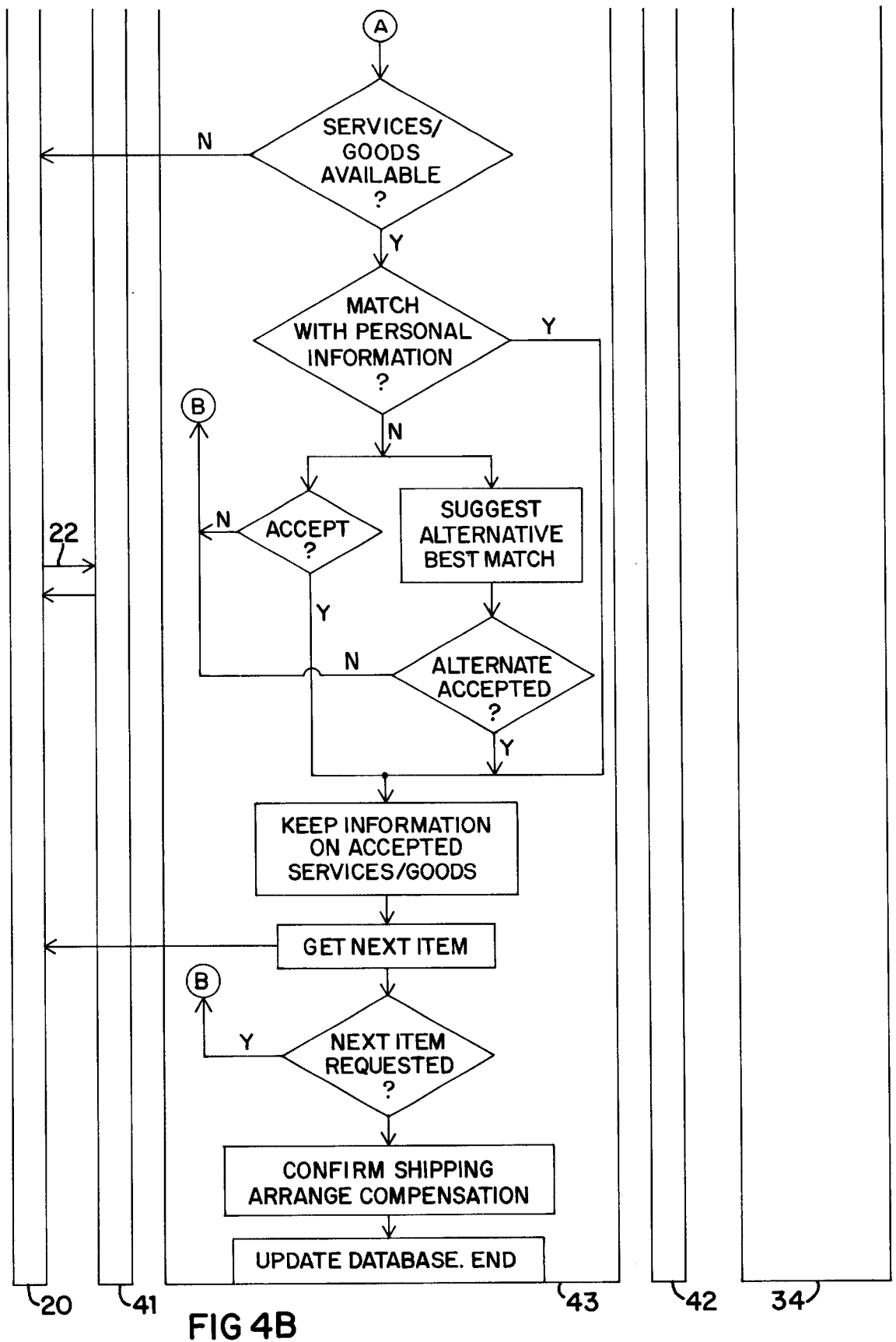

With reference to FIGS. 4A and 4B in combination with FIG. 3, the individual 100 having a personal code initiates contact with a goods/services provider by way of provider unit 40. The provider processor 43 obtains the individual's personal code and transmits that information as well as its own access code to the database processor 32 for validation. If the access code is denied, the link between the database unit 30 and the provider unit 40 is preferably terminated or the provider is otherwise advised that such problem exists, with resolution of the problem an option. If access is denied, the provider must communicate with the individual 100 regarding personal information via the slower conventional methods previously described. If access to the database is permitted, the processor 32 for validity reviews the personal code for the individual 100. If denied, the database unit 30 notifies the provider unit 40 for confirmation, revision, or the like. If the personal code is validated, only personal information of interest to that particular type of provider for the individual 100 is transmitted to the provider processor 43. The system 10 preferably includes means to require the provider to arrange for compensation to the entity responsible for development and/or maintenance of the master database. Of course, if the provider were an emergency service provider for example, access to the relevant personal information, at least in the case of an emergency situation, would likely not be contingent upon arrangement for compensation. Instead, access would likely be provided automatically.

With continuing reference to FIGS. 4A and 4B, the remainder of the interfacing will occur between the individual 100 and the provider unit 40. Specifically, the provider unit 40 obtains from the individual 100 a first request for a service or an item. That service/goods input from the individual 100 is compared to the database of provider's available services/goods as well as the personal information for that individual as received from the database unit 30 for a match. In addition, a compilation of consumer requests can be developed by directing the input information into the storage unit 44. If a match is confirmed, the transaction information may be retained and the individual 100 advised of the match. If the comparison yields no match, the individual 100 is advised and asked whether to accept that which is available, accept the next best match to that requested, to proceed to another services/goods request, or to terminate the transaction. If an alternative is accepted, that information is retained. The individual 100 is then prompted to request the next services or goods of interest and the cycle described repeated. Of course, since the provider unit 40 has the personal information from the database unit 30, the cycle time is substantially less than that of existing transactional processes.

The balance of the processing steps is straightforward. When the individual 100 instructs the provider that no other goods or services are to be requested, the transactional information is confirmed, billing and shipping information confirmed, and the process terminated. The provider may then update its internal database storage unit 44 to assist in tailoring its inventory, service procedures, and the like, to the most common requests made. It can be seen that those with reasonable skill in the development of computer programs will be able to create a working system of the present invention based upon a review of this detailed description and consideration of FIGS. 3 and 4.

It should be understood that the preferred embodiment of the present invention as described herein is merely illustrative. Numerous variations and equivalents in design and use of the present invention may be contemplated in view of the following claims without straying from the intended scope and field of the invention disclosed.

We claim:

1. A system for assisting in activities related to purchasing an offering, wherein an offering may be either a good or a service, or both, the system comprising:

a first computer adapted to receive characteristic information provided by an individual, and to transmit the characteristic information upon request of the individual over a network to a remote master database;

the master database, coupled to the network and remote from the first computer, and adapted to receive and store the characteristic information for the individual, adapted to generate a unique personal code for the individual, and to transmit the personal code to the first computer; the master database further storing for each of a plurality of different providers, including a first provider, a database access code associated with each provider; and a provider computer of the first provider, at a location remote from the first computer and the master database, and coupled to the master database and the first computer via the network, the provider computer adapted to receive from the first computer a request for a type of offering to be provided to the individual and the unique personal code for the individual, and adapted to transmit the database access code of the first provider and the unique personal code of the individual to the master database, upon authentication of the database access code and the unique personal code by the master database, the master database transmits the characteristic information of the individual relevant to the type of offering to the provider computer, the provider computer selects a particular offering of the requested type and corresponding to the characteristics of the individual and transmits information about the selected offering to the first computer.

2. The system of claim 1 wherein the first computer is adapted to receiving the unique personal code for the individual from a gift giver and transmitting a request from the gift giver for the type of offering to be provided to the individual and the unique personal code for the individual to the provider computer.

3. The system of claim 1 further comprising:

a second computer adapted to receiving the unique personal code for the individual provided by a gift giver, the second computer at a location remote from the first computer, the provider computer and the master database, and coupled to the master database, the provider computer and the first computer via the network; and the provider computer of the first provider adapted to receive from the second computer a request for a type of offering to be provided to the individual and the unique personal code for the individual, and adapted to transmit the database access code of the first provider and the unique personal code of the individual to the master database, upon authentication of the database access code and the unique personal code by the master database, the master database transmits the characteristic information of the individual relevant to the type of offering to the provider computer, the provider computer selects a particular offering of the requested type and corresponding to the characteristics of the individual and transmits information about the selected offering to the second computer.

4. The system of claim 1 wherein the characteristic information comprises size-related information.

5. The system of claim 1 wherein the characteristic information comprises clothing taste preferences.

6. The system of claim 1 wherein the characteristic information comprises footwear taste preferences.

7. The system of claim 1 wherein the characteristic information comprises clothing sizing information.

8. The system of claim 1 wherein the characteristic information comprises footwear sizing information.

9. A method for assisting in activities related to purchasing an offering, wherein an offering may be either a good or a service, or both, the method comprising:

storing at a master database a plurality of database access codes, each database access code associated with a different provider;

receiving at the master database characteristic information for each of a plurality of individuals over a network from computers, including a first computer, at locations remote from the master database;

generating in the master database a unique personal code for each individual in response to receiving the individual's characteristic information;

transmitting from the master database the unique personal code to each individual's computer;

receiving a request for a type of offering to be provided to one of the individuals and the personal code associated with the individual from the first computer over the network at a provider computer of a first provider that is remotely situated with respect to the first computer and the master database, and coupled to the master database and the first computer via the network;

receiving at the master database a database access code of the provider and the personal code of the individual from the provider computer;

authenticating in the master database the database access code and the unique personal code;

upon authentication, transmitting from the master database the characteristic information of the individual associated with the personal code and relevant to the type of offering to the provider computer;

selecting by the provider computer a particular offering of the requested type and corresponding to the characteristics of the individual; and transmitting from the provider computer information about the selected offering from the provider computer to the first computer.

10. The method of claim 9 further comprises receiving the unique personal code for the individual from a gift giver by a first computer and transmitting a request from the gift giver for the type of offering to be provided to the individual and the unique personal code for the individual from the first computer to the provider computer.

11. The method of claim 9 further comprising:

receiving at a second computer the personal code for the individual provided by a gift giver, the second computer at a location remote from the first computer, the provider computer and the master database, and coupled to the master database, the provider computer and the first computer via the network;

receiving a request for a type of offering to be provided to the individual and the personal code associated with the individual from the second computer over the network at a provider computer;

receiving at the master database a database access code of the provider and the personal code of the individual from the provider computer;

authenticating in the master database the database access code and the unique personal code;

upon authentication, transmitting from the master database the characteristic information of the individual associated with the personal code and relevant to the type of offering to the provider computer;

the provider computer selecting a particular offering of the requested type and corresponding to the characteristics of the individual; and transmitting information about the selected offering from the provider computer to the second computer.

12. The method of claim 9 wherein the characteristic information comprises size-related information.

13. The method of claim 9 wherein the characteristic information comprises clothing taste preferences.

14. The method of claim 9 wherein the characteristic information comprises footwear taste preferences.

15. The method of claim 9 wherein the characteristic information comprises clothing sizing information.

16. The method of claim 9 wherein the characteristic information comprises footwear sizing information.

17. In a system for assisting in purchasing-related activities, the system including a first computer coupled into a network, a provider computer of the first provider coupled into the network, and a master database coupled into the network, the master database comprising:

characteristic information provided by each of a plurality of individuals;

a unique personal code for each individual;

for each of a plurality of providers, a database access code associated with each provider;

programmed logic adapted to receive from the first computer at a remote location characteristic information of one of the individuals over the network, and further adapted to generate the unique personal code for the individual and send the unique personal code to the first computer; and programmed logic adapted to receive, from the provider computer, the provider computer at a location remote from the first computer and the master database, the database access code for the provider and the unique personal code of the individual and further adapted to authentication of the database access code and the personal code and transmission of the characteristic information of the individual relevant to the provider.

18. The system of claim 17 wherein the characteristic information comprises size-related information.

19. The system of claim 17 wherein the characteristic information comprises clothing taste preferences.

20. The system of claim 17 wherein the characteristic information comprises footwear taste preferences.

21. The system of claim 17 wherein the characteristic information comprises clothing sizing information.

22. The system of claim 17 wherein the characteristic information comprises footwear sizing information.

23. In a network including a first computer coupled to a network, a provider computer of a first provider coupled to the network, and a master database coupled to the network and storing characteristic information for each of a plurality of individuals, a unique personal code for each individual, and a database access code for each of a plurality of different providers, a method of assisting in activities related to purchasing an offering, wherein an offering may be either a good or a service, or both, the method comprising:

receiving characteristic information provided by one of the individuals over the network from the first computer at a remote location from the master database and the provider computer;

generating the unique personal code for the individual in response to receiving the characteristic information;

receiving a database access code of a provider and the unique personal code over the network from the provider computer at a location remote from the first computer and the master database;

authenticating the database access code and the unique personal code; and upon authentication, the master database sending the characteristic information of the individual relevant to the provider to the provider computer over the network.

24. The system of claim 23 wherein the characteristic information comprises size-related information.

25. The system of claim 23 wherein the characteristic information comprises clothing taste preferences.

26. The system of claim 23 wherein the characteristic information comprises footwear taste preferences.

27. The system of claim 23 wherein the characteristic information comprises clothing sizing information.

28. The system of claim 23 wherein the characteristic information comprises footwear sizing information.

29. In a system for assisting in purchasing-related activities, the system including a first computer coupled into a network, the first computer adapted to receive characteristic information provided by an individual, and to transmit the characteristic information upon request of the individual over a network to a remote master database coupled to the network, the master database comprising characteristic information for each of a plurality of individuals, a unique personal code for each individual, and a database access code for each of a plurality of different providers, and a provider computer of a first provider coupled into the network, the provider computer programmed to perform the operations of:

receiving from the first computer at a remote location a request for a type of offering and the unique personal code for the individual;

transmitting to the master database a database access code for the provider and the unique personal code of the individual;

receiving characteristic information of the individual relevant to the provider from the master database upon authentication of the database access code and the personal code;

selecting a particular offering of the requested type and corresponding to the characteristics of the individual; and transmitting information about the selected offering to the first computer.

30. The system of claim 29 wherein the characteristic information comprises size-related information.

31. The system of claim 29 wherein the characteristic information comprises clothing taste preferences.

32. The system of claim 29 wherein the characteristic information comprises footwear taste preferences.

33. The system of claim 29 wherein the characteristic information comprises clothing sizing information.

34. The system of claim 29 wherein the characteristic information comprises footwear sizing information.

35. In a network including a first computer coupled to a network, the first computer adapted to receive characteristic information provided by an individual, and to transmit the characteristic information upon request of the individual over a network to a remote master database coupled to the network, the master database storing characteristic information for each of a plurality of individuals, a unique personal code for each individual, and a database access code for each of a plurality of different providers, and a provider computer of a first provider coupled into the network, a method of assisting in activities related to purchasing an offering, wherein an offering may be either a good or a service, or both, the method comprising:

receiving from the first computer at a remote location a request for a type of offering and the unique personal code for the individual;

transmitting to the master database a database access code for the provider and the unique personal code of the individual;

receiving characteristic information of the individual relevant to the provider from the master database upon authentication of the database access code and the personal code;

selecting a particular offering of the requested type and corresponding to the characteristics of the individual; and transmitting information about the selected offering to the first computer.

36. The system of claim 35 wherein the characteristic information comprises size-related information.

37. The system of claim 35 wherein the characteristic information comprises clothing taste preferences.

38. The system of claim 35 wherein the characteristic information comprises footwear taste preferences.

39. The system of claim 35 wherein the characteristic information comprises clothing sizing information.

40. The system of claim 35 wherein the characteristic information comprises footwear sizing information.

41. In a system for assisting a gift giver in purchasing a gift for an individual, the system including a first computer coupled into a network, the first computer adapted to receive characteristic information provided by an individual, to transmit the characteristic information upon request of the individual over a network to a remote master database and to receive a unique personal code from the master database, a second computer coupled into the network, the master database coupled to the network, the master database storing characteristic information for each of a plurality of individuals, a unique personal code for each individual, and a database access code for each of a plurality of different providers, and a provider computer of a first provider coupled into the network, the provider computer adapted to transmit the database access code of the first provider and the unique personal code of one of the individuals to the master database, upon authentication of the database access code and the unique personal code by the master database, to receive the characteristic information of the individual, and select a particular offering of a requested type and corresponding to the characteristics of the individual, the second computer programmed to perform the operations of:

receiving a unique personal code for the individual provided by a gift giver;

transmitting over the network a request for a type of offering to be provided to the individual and the unique personal code for the individual to the provider computer at a location remote from the first computer, the second computer and the master database, wherein the provider computer selects a particular offering of the requested type and corresponding to the characteristics of the individual; and receiving information about the selected offering from the provider computer.

42. The system of claim 41 wherein the characteristic information comprises size-related information.

43. The system of claim 41 wherein the characteristic information comprises clothing taste preferences.

44. The system of claim 41 wherein the characteristic information comprises footwear taste preferences.

45. The system of claim 41 wherein the characteristic information comprises clothing sizing information.

46. The system of claim 41 wherein the characteristic information comprises footwear sizing information.

47. In a network including a first computer coupled to a network, a first computer coupled into a network, the first computer adapted to receive characteristic information provided by an individual, to transmit the characteristic information upon request of the individual over a network to a remote master database and to receive a unique personal code from the master database, a second computer coupled into a network, the master database coupled to the network comprising characteristic information for each of a plurality of individuals, a unique personal code for each individual, and a database access code for each of a plurality of different providers, and a provider computer of a first provider coupled into the network, the provider computer adapted to transmit the database access code of the first provider and the unique personal code of the individual to the master database, upon authentication of the database access code and the unique personal code by the master database, to receive the characteristic information of the individual, and select a particular offering of a requested type and corresponding to the characteristics of the individual, a method of assisting a gift giver in purchasing a gift for an individual, the method comprising:

receiving a unique personal code for the individual provided by a gift giver;

transmitting over the network a request for a type of offering to be provided to the individual and the unique personal code for the individual to the provider computer at a location remote from the first computer, the second computer and the master database, wherein the provider computer selects a particular offering of the requested type and corresponding to the characteristics of the individual; and receiving information about the selected offering from the provider computer.

48. The system of claim 47 wherein the characteristic information comprises size-related information.

49. The system of claim 47 wherein the characteristic information comprises clothing taste preferences.

50. The system of claim 47 wherein the characteristic information comprises footwear taste preferences.

51. The system of claim 47 wherein the characteristic information comprises clothing sizing information.

52. The system of claim 47 wherein the characteristic information comprises footwear sizing information.

53. In a network including a first computer coupled to a network, the first computer adapted to receive characteristic information provided by an individual, and to transmit the characteristic information upon request of the individual over a network to a remote master database coupled to the network, the master database storing characteristic information for each of a plurality of individuals, a unique personal code for each individual, and a database access code for each of a plurality of different providers, and a provider computer of a first provider coupled into the network, a computer usable medium comprising instructions embodied thereon, which when executed by a processor cause the processor to perform a method of assisting in activities related to purchasing an offering, wherein an offering may be either a good or a service, or both, the method comprising:

receiving from the first computer at a remote location a request for a type of offering and the unique personal code for the individual;

transmitting to the master database a database access code for the provider and the unique personal code of the individual;

receiving characteristic information of the individual relevant to the provider from the master database upon authentication of the database access code and the personal code;

selecting a particular offering of the requested type and corresponding to the characteristics of the individual; and transmitting information about the selected offering to the first computer.

54. In a network including a first computer coupled to a network, a provider computer of a first provider coupled to the network, and a master database coupled to the network and storing characteristic information for each of a plurality of individuals, a unique personal code for each individual, and a database access code for each of a plurality of different providers, a computer usable medium comprising instructions embodied thereon, which when executed by a processor cause the processor to perform a method of assisting in activities related to purchasing an offering, wherein an offering may be either a good or a service, or both, the method comprising:

receiving characteristic information provided by one of the individuals over the network from the first computer at a remote location from the master database and the provider computer;

generating the unique personal code for the individual in response to receiving the characteristic information;

receiving a database access code of a provider and the unique personal code over the network from the provider computer at a location remote from the first computer and the master database;

authenticating the database access code and the unique personal code; and upon authentication, the master database sending the characteristic information of the individual relevant to the provider to the provider computer over the network.

\* \* \* \* \*